US012686082B2

(12) United States Patent
Sato et al.

(10) Patent No.: US 12,686,082 B2
(45) Date of Patent: Jul. 21, 2026

(54) COILING MACHINE, METHOD FOR MANUFACTURING COIL SPRING, AND COIL SPRING

(71) Applicant: NHK SPRING CO., LTD., Yokohama (JP)

(72) Inventors: Takuya Sato, Yokohama (JP); Yuichiro Yamauchi, Yokohama (JP); Takeshi Furuse, Yokohama (JP); Ryo Tanaka, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 1061 days.

(21) Appl. No.: 17/395,684

(22) Filed: Aug. 6, 2021

(65) Prior Publication Data

US 2021/0362274 A1 Nov. 25, 2021

Related U.S. Application Data

(63) Continuation of application No. PCT/JP2019/046219, filed on Nov. 26, 2019.

(30) Foreign Application Priority Data

Feb. 6, 2019 (JP) ................................. 2019-019754

(51) Int. Cl.
| | |
|---|---|
| *B23K 26/354* | (2014.01) |
| *B21F 3/04* | (2006.01) |
| *B21F 11/00* | (2006.01) |
| *B23K 26/00* | (2014.01) |
| *B23K 26/08* | (2014.01) |

(52) U.S. Cl.
CPC .............. *B23K 26/354* (2015.10); *B21F 3/04* (2013.01); *B21F 11/005* (2013.01); *B23K 26/0093* (2013.01); *B23K 26/083* (2013.01)

(58) Field of Classification Search
USPC ...................................................... 219/121.67
See application file for complete search history.

(56) References Cited

U.S. PATENT DOCUMENTS

| | | | | |
|---|---|---|---|---|
| 2,995,648 | A | * 8/1961 | Robert | ...................... B21F 3/04 219/153 |
| 4,705,580 | A | 11/1987 | Yamazaki | |

(Continued)

FOREIGN PATENT DOCUMENTS

| | | |
|---|---|---|
| CN | 103753223 A | 4/2014 |
| CN | 105377466 A | 3/2016 |

(Continued)

OTHER PUBLICATIONS

Extended European Search Report (EESR) dated Sep. 27, 2022, issued in counterpart European Application No. 19914558.2.

(Continued)

*Primary Examiner* — Elizabeth M Kerr
*Assistant Examiner* — Simpson A Chen
(74) *Attorney, Agent, or Firm* — Holtz, Holtz & Volek PC

(57) ABSTRACT

A coiling machine includes a laser heating machine configured to irradiate a wire formed into a helical shape with laser light to thereby heat a part of the wire, and cutting components configured to cut a portion of the wire after the irradiation of the laser light is stopped, a temperature of the portion being higher than before irradiated with the laser light.

6 Claims, 11 Drawing Sheets

(56) References Cited

U.S. PATENT DOCUMENTS

| 5,285,669 | A | 2/1994 | Itaya |
| 10,556,265 | B2 | 2/2020 | Furuse et al. |
| 2008/0302156 | A1 * | 12/2008 | Itaya ........................ B21F 3/02 |
| | | | 72/138 |
| 2014/0306389 | A1 | 10/2014 | Ikai et al. |
| 2015/0252863 | A1 * | 9/2015 | Ono ........................ C22C 38/46 |
| | | | 148/226 |
| 2018/0071812 | A1 | 3/2018 | Furuse et al. |
| 2021/0323047 | A1 | 10/2021 | Furuse et al. |

FOREIGN PATENT DOCUMENTS

| CN | 106040920 | A | | 10/2016 | |
| DE | 102008002214 | A1 | | 12/2008 | |
| EP | 3021995 | A1 | | 5/2016 | |
| GB | 1374915 | A | | 11/1974 | |
| JP | 66250028 | A | | 3/1987 | |
| JP | H06218476 | A | | 8/1994 | |
| JP | H0919115 | A | * | 1/1997 | |
| JP | H10180384 | A | | 7/1998 | |
| JP | 2000107827 | A | * | 4/2000 | |
| JP | 2004330209 | A | | 11/2004 | |
| JP | 2005138284 | A | | 6/2005 | |
| JP | 2006026730 | A | | 2/2006 | |
| JP | 2009012037 | A | | 1/2009 | |
| JP | 2013036113 | A | | 2/2013 | |
| JP | 2016024022 | A | | 2/2016 | |
| WO | WO-2015007496 | A1 | * | 1/2015 | ............ B21F 11/005 |

OTHER PUBLICATIONS

International Search Report (ISR) (and English language translation thereof) and Written Opinion dated Feb. 4, 2020 issued in International Application No. PCT/JP2019/046219.

Japanese Office Action (and an English language translation thereof) dated May 9, 2023, issued in counterpart Japanese Application No. 2022-073234.

Chinese Office Action (and English language translation thereof) dated Nov. 2, 2022, issued in counterpart Chinese Application No. 201980090847.4.

\* cited by examiner

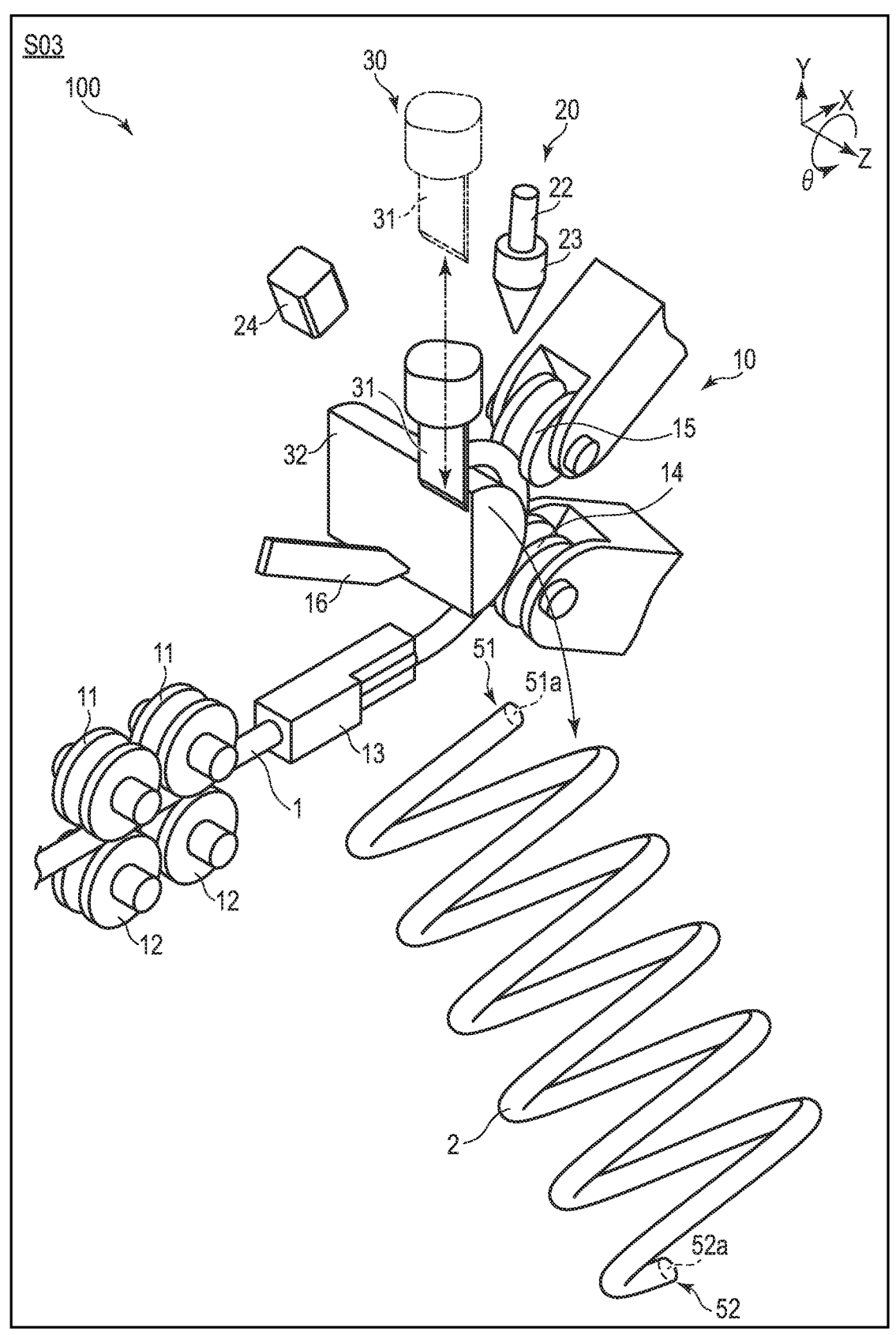
F I G. 10

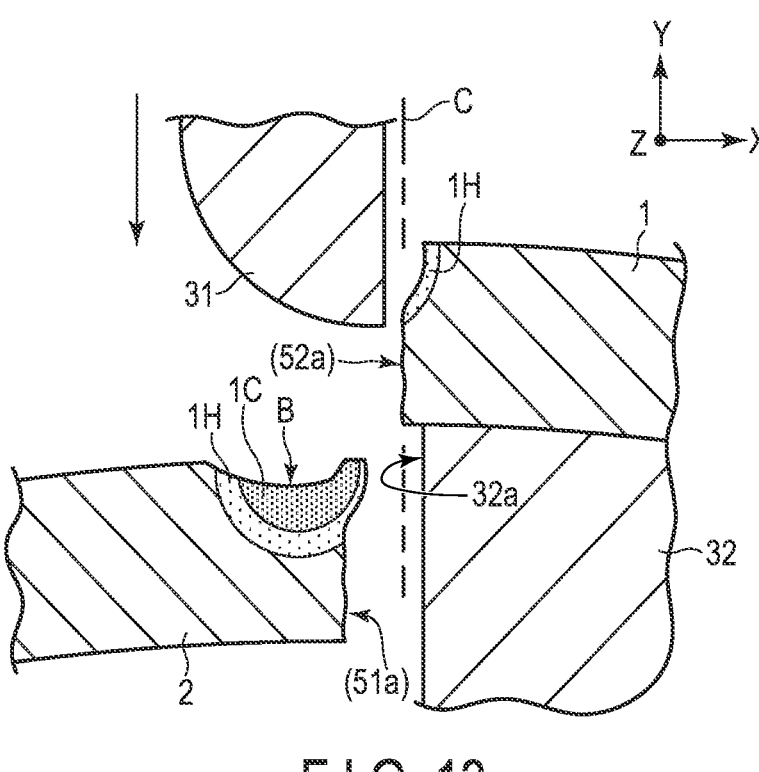
F I G. 13
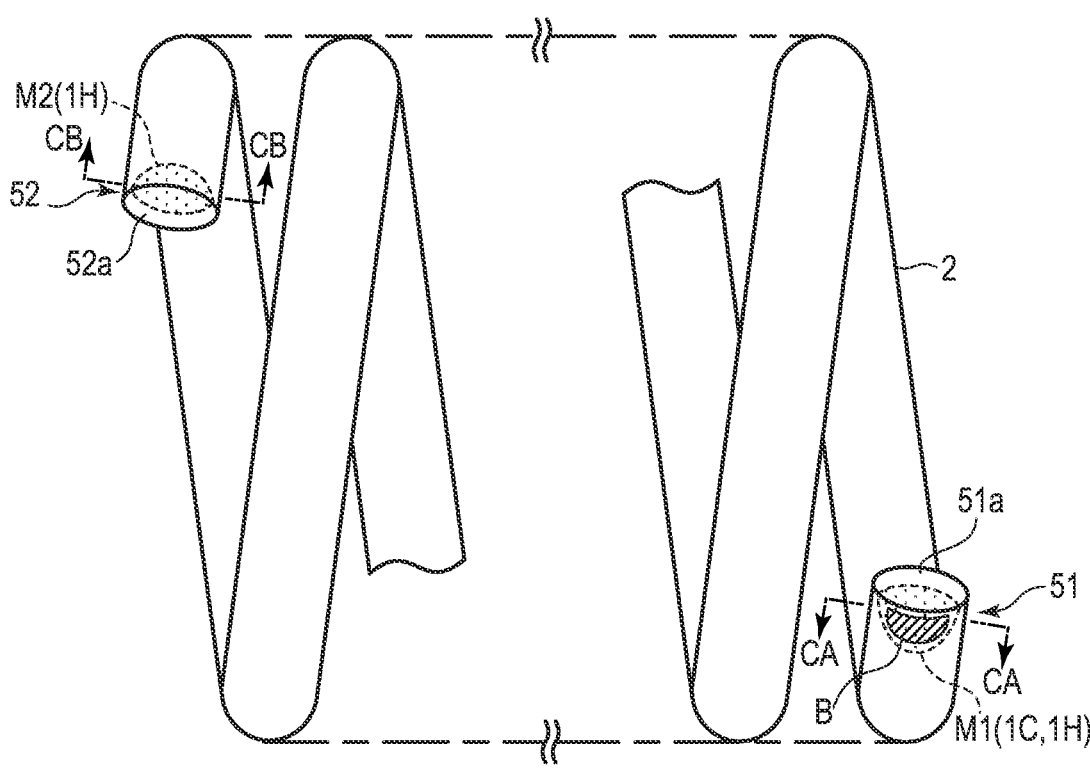
F I G. 14

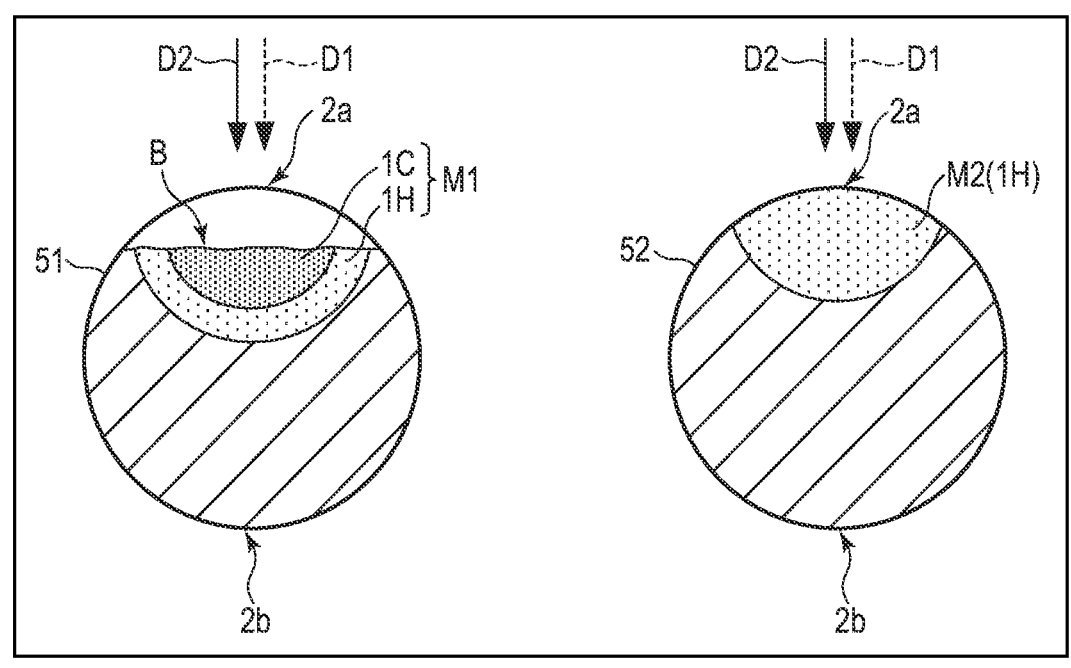
F I G. 15
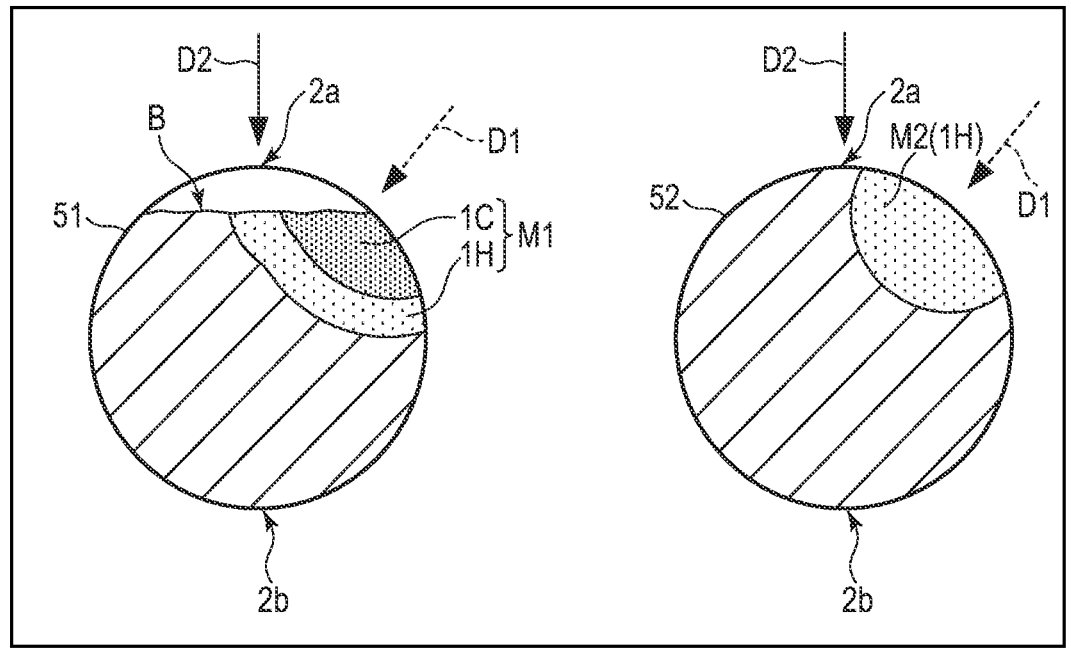
F I G. 16

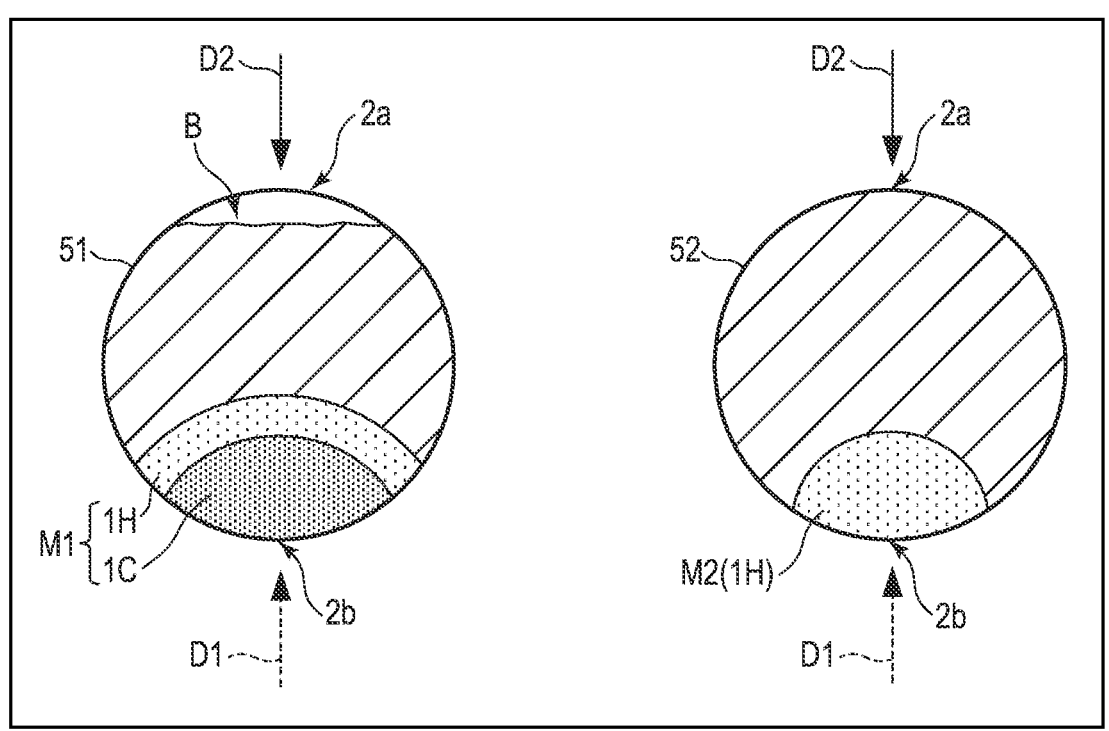
F I G. 17
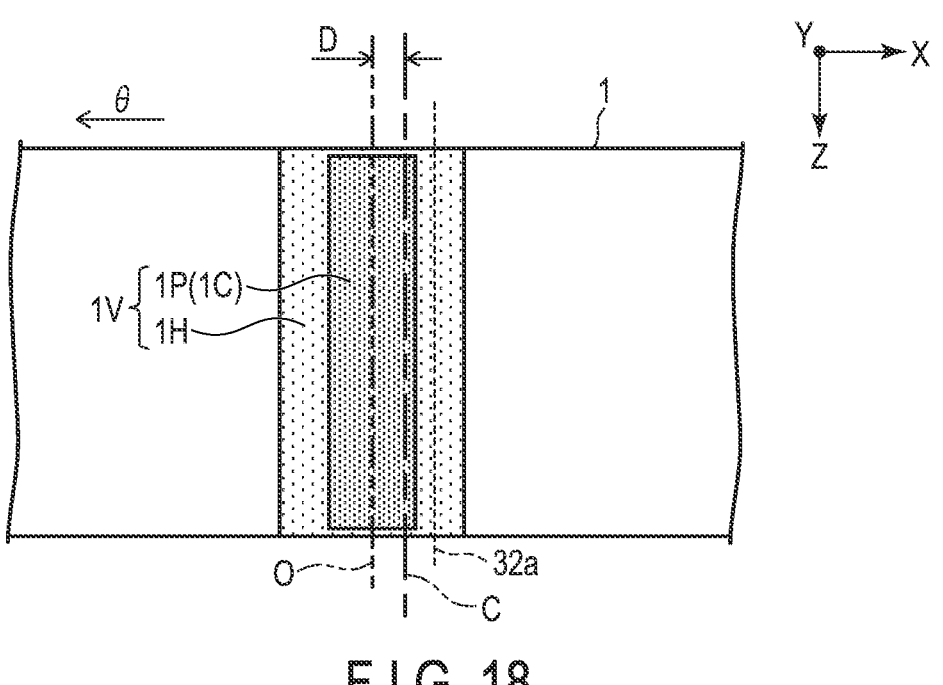
F I G. 18

COILING MACHINE, METHOD FOR MANUFACTURING COIL SPRING, AND COIL SPRING

CROSS-REFERENCE TO RELATED APPLICATIONS

This application is a Continuation Application of PCT Application No. PCT/JP2019/046219, filed Nov. 26, 2019 and based upon and claiming the benefit of priority from prior Japanese Patent Application No. 2019-019754, filed Feb. 6, 2019. The entire contents of all of which are incorporated herein by reference.

BACKGROUND OF THE INVENTION

1. Field of the Invention

Inventions described herein relate to a coiling machine configured to manufacture a coil spring, manufacturing method of a coil spring, and coil spring.

2. Description of the Related Art

As a device configured to manufacture a coil spring, for example, a coil spring forming machine described in JP S62-50028 A is known. This coil spring forming machine calculates in advance a position of a cutting portion on the basis of a length of a wire to be formed into a helical, shape, and cuts the wire at the cutting portion in a state where the cutting portion is softened by high-frequency heating.

On the other hand, as in the case of the spring manufacturing device described in JP H06-218476 A, a coiling machine configured to cut a wire formed into a helical shape by means of laser light is also known.

In the coil spring forming machine of JP S62-50028 A, the cutting portion is heated by high-frequency heating, and hence the responsiveness of heating of the cutting portion is not good. Moreover, cutting is carried out in the state where the cutting portion is continuously heated by high-frequency heating, and hence there is sometimes a case where the members used for cutting are adversely affected by the high-frequency heating. Furthermore, regarding the high-frequency heating, the responsiveness of heating of the cutting portion is not sufficient, and the wire is coiled in the state where the wire is partially heated, and hence there is a possibility of the forming accuracy of the spring becoming difficult to be maintained constant.

On the other hand, in the spring manufacturing device of JP H06-218476 A, high-power laser light capable of cutting a wire becomes necessary. In this case, a spatter resulting from laser light irradiation may occur, and laser light can possibly be applied to not only the wire, but also to various parts of the manufacturing device, and hence countermeasures should be taken against these problems.

BRIEF SUMMARY OF THE INVENTION

Present inventions make it one of the objects to provide a coiling machine and manufacturing method of a coil spring making it possible to easily cut a wire formed into a helical shape, and to further provide a coil spring excellent in quality.

A coiling machine according to the present invention includes a laser heating machine configured to irradiate a wire formed into a helical shape with laser light to thereby heat a part of the wire, and cutting components configured to cut a portion of the wire after the irradiation of the laser light is stopped, a temperature of the portion being higher than before irradiated with the laser light.

A manufacturing method of a coil spring according to the present invention includes irradiating a wire formed into a helical shape with laser light to thereby heat a part of the wire, and cutting a portion of the wire after the irradiation of the laser light is stopped, a temperature of the portion being higher than before irradiated with the laser light.

A coil spring according to the present invention is formed of a wire including a first end and a second end opposite to the first end, the first end includes a first irradiation scar of laser light, the first irradiation scar includes a quench-hardened zone the hardness of which is higher than a base material of the wire, and a first heat affected zone which is positioned around the quench-hardened zone and the hardness of which is lower than the base material, and the first heat affected zone extends to at least a part of an end face of the first end.

According to the present invention, it is possible to provide a coiling machine and manufacturing method of a coil spring making it possible to easily cut a wire formed into a helical shape. Furthermore, according to the present invention, it is possible to provide a coil spring excellent in quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a schematic perspective view showing a process of cutting a wire by means of a cutting unit.

FIG. 13 is a cross-sectional view showing a state where a wire is cut by lowering the cutter from the state shown in FIG. 12.

FIG. 14 is a schematic side view of a coil spring cut off from the wire.

FIG. 15 is a schematic cross-sectional view of a coil spring showing a first example of a first irradiation scar, second irradiation scar, and dent.

FIG. 16 is a schematic cross-sectional view of a coil spring showing a second example of the first irradiation scar, second irradiation scar, and dent.

FIG. 17 is a schematic cross-sectional view of a coil spring showing a third example of the first irradiation scar, second irradiation scar, and dent.

FIG. 18 is a schematic plan view of a wire after being irradiated with laser light of a shape shown in FIG. 6.

DETAILED DESCRIPTION OF THE INVENTION

Some embodiments concerning a coiling machine, manufacturing method of a coil spring, and coil spring will be described below with reference to the accompanying drawings.

First Embodiment

Figure 1:
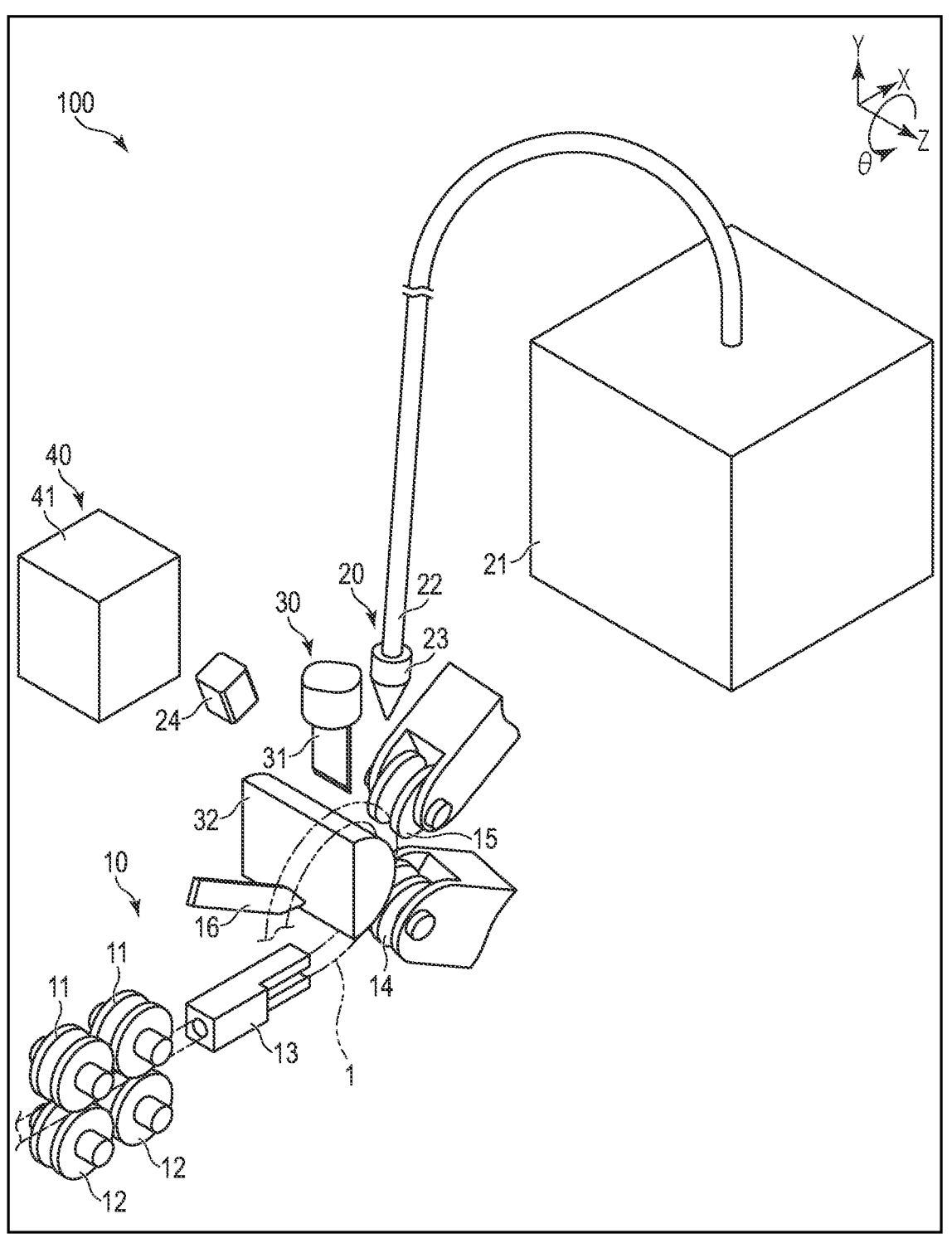
FIG. 1 is a schematic perspective view of a coiling machine according to a first embodiment.
Figure 2:
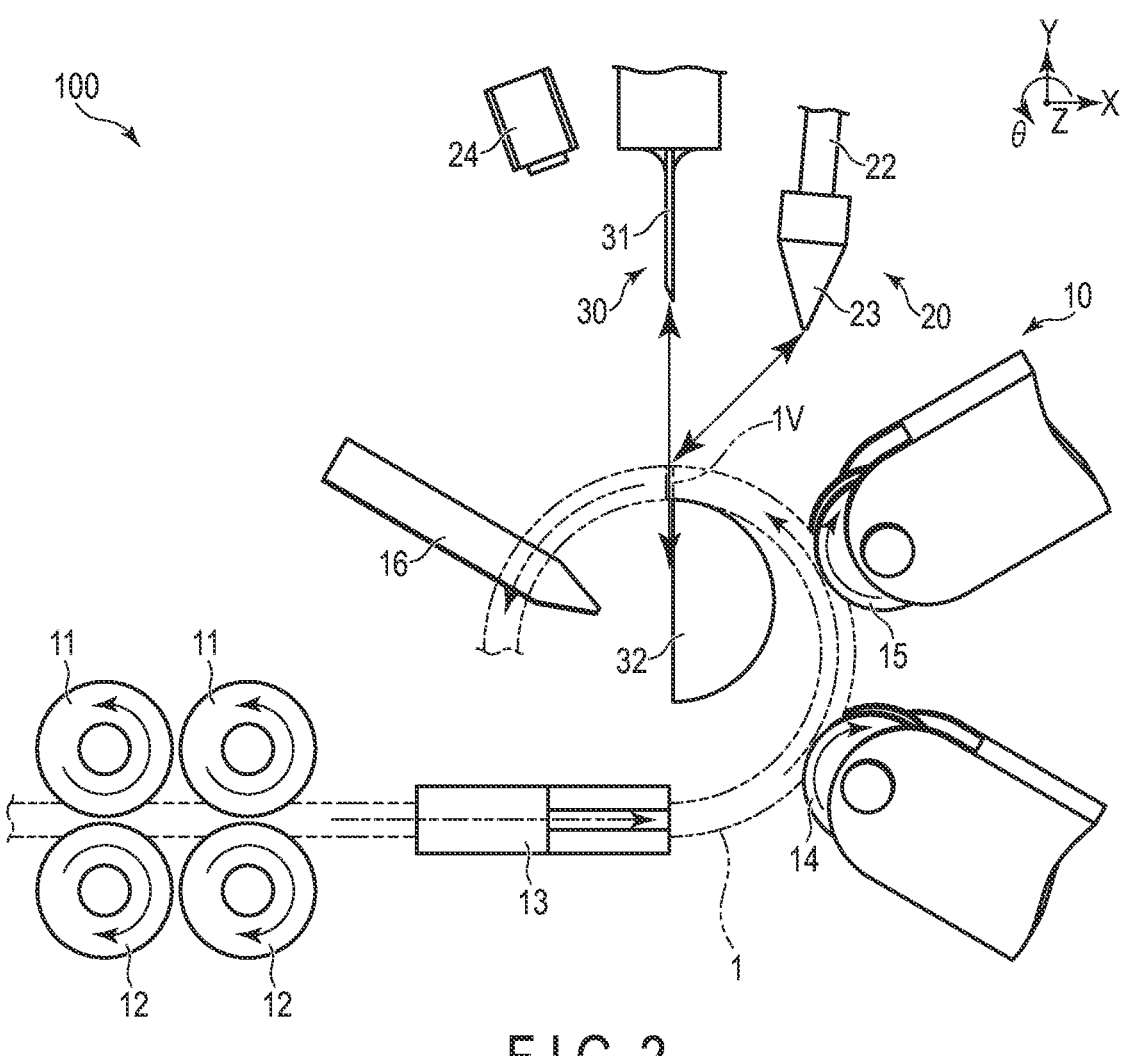
FIG. 2 is a schematic front view of the coiling machine of FIG. 1.

FIG. 1 is a schematic perspective view showing the main part of a coiling machine 100 according to a first embodiment. FIG. 2 is a schematic front view of the coiling machine 100 of FIG. 1. The X-direction, Y-direction, Z-direction, and G-direction are defined as shown in FIG. 1 and FIG. 2. The X-direction, Y-direction, and Z-direction are orthogonal to each other. The X-direction is the wire-feeding direction. The Z-direction is the direction in which the helix of the coil spring is formed. The θ-direction is the direction in which a wire constituting the coil spring wound.

The coiling machine 100 includes a helix forming unit 10, heating unit (laser heating machine 20), cutting unit 30, and control unit 40.

The helix forming unit 10 forms the wire 1 which is the material for the coil spring into a helical shape while feeding the wire thereto. The helix forming unit 10 described above includes a pair of driving rollers 11, a pair of driven rollers 12, wire guide 13, first forming roller 14, second forming roller 15, and pitch tool 16.

Each of the driving rollers 11 and each of the driven rollers 12 are opposed to each other with a gap held between them. When each of the driving rollers 11 rotates, each of the driven rollers 12 is rotated through the wire. The wire 1 pinched between each driving roller 11 and each driven roller 12 is moved in the X-direction shown in FIG. 1 and FIG. 2. The wire 1 is inserted through the wire guide 13. The wire guide 13 guides the wire 1 in such a manner that the wire 1 moves straight ahead in the X-direction to thereby lead the wire 1 to the first forming roller 14.

The first forming roller 14, second forming roller 15, and pitch tool 16 are arranged in this order in the θ-direction and, when viewed from above, the order of their positions is different from the above in the Z-direction. The first forming roller 14 guides the wire 1 moving in the X-direction to the second forming roller. 15 while bending the wire 1 into an arc-like shape and moving the wire 1 in the Y-direction shown in FIG. 1. The second forming roller 15 guides the wire 1 moving forward in an arc-like shape to the pitch tool 16 while further bending the wire 1 into the arc-like shape. The wire 1 guided by the pitch tool 16 moves in the Z-direction shown in FIG. 1 in a helically-formed state.

The laser heating machine 20 radiates laser light in such a manner as to heat a part of the wire 1 formed into a helical shape. Owing to the irradiation of the laser light, a heated portion 1V the temperature of which is higher than the other portions is formed in the wire 1. The laser heating machine 20 described above includes a laser oscillator 21, optical fiber 22, and beam-spot regulator 23.

As the laser oscillator 23, for example, a semiconductor laser configured to generate laser light can be used. The optical fiber 22 transmits the laser light generated by the laser oscillator 21 to the beam spot regulator 23. The beam spot regulator 23 modifies the beam shape of the laser light into a rectangular shape or circular shape. As the beam spot regulator 23, for example, an optical element such as a beam homogenizer or the like can be used.

The laser heating machine 20 may further include a measuring instrument 24 configured to measure the temperature of the heated portion 1V. The measuring instrument 24 includes, for example, a sensor configured to detect the temperature of the heated portion 1V of the wire 1. In order to avoid interference with the cutting unit 30, the measuring instrument 24 may be provided on the lateral side of the cutting unit 30. In order to avoid interference with the cutter 31 to be described later, the measuring instrument 30 can also be configured in such a manner as to rove away from the cutter 31 in conjunction with the operation of the cutter 31. The measurement result obtained by the measuring instrument 24 can be used for, for example, control of the timing for cutting the wire 1 to be carried out by the cutting unit 30.

It should be noted that the measuring instrument. 24 is not an indispensable configuration. That is, various conditions concerning cutting of the wire 1 may be set in advance without using the measuring instrument 24, and the cutting unit 30 may cut the heated portion 1V on the basis of the conditions.

The laser heating machine 20 may further include a migration stage configured to move the beam spot regulator 23 closer to or away from the heated portion 1V of the wire 1. The migration stage can be constituted of, for example, a direct-acting stage or robot hand. When the operating distance of the beam spot regulator 23 can be set sufficiently long or when the interference between the beam spot regulator 23 and cutting unit 30 can be avoided, there is no need to use the migration stage.

As shown in FIG. 2, the cutting unit 30 cuts the heated portion 1V of the wire 1 the temperature of which is higher than before being irradiated with the laser light after the irradiation of the laser light is stopped. The cutting unit 30 described above includes the cutter 31 and mandrel 32.

The cutter 31 is arranged at a position between the second forming roller 15 and pitch tool 16, and above these members in the Y-direction. The cutter 31 includes a sharp cutting blade the cutting edge of which is in the Z-direction at a tip thereof. The cutter 31 is configured to be movable up and down in the Y-direction by means of a direct-acting stage not shown. The mandrel 32 is arranged inside the circular arc along which the first forming roller 14, second forming roller 15, and pitch tool 16s are arranged. The shape of the mandrel 32 in the X-Y plane is semicircular as shown in, for example, FIG. 2, and extends to elongate in the V-direction. The mandrel 32 supports the inner circumferential surface of the wire 1 formed into the helical shape on the upper part of the circular arc surface thereof.

The control unit 40 controls the helix forming unit 10, laser heating machine 20, and cutting unit 30. The control unit 40 described above includes a controller 41.

The controller 41 includes a read only memory ROM), central processing unit (CPU), and random access memory (RAM). The ROM stores therein computer programs for controlling the helix forming unit 10, laser heating machine 20, and cutting unit 30. The CPU executes the computer programs stored in the ROM. The RAM temporarily stores therein, while the computer programs are executed by the CPU, various data items occurring concomitantly with the execution of the computer programs.

Subsequently, a manufacturing process of the coil spring 2 using the coiling machine 100 according to this embodiment will be described below with reference to FIGS. 3 to 10.

Figure 3:
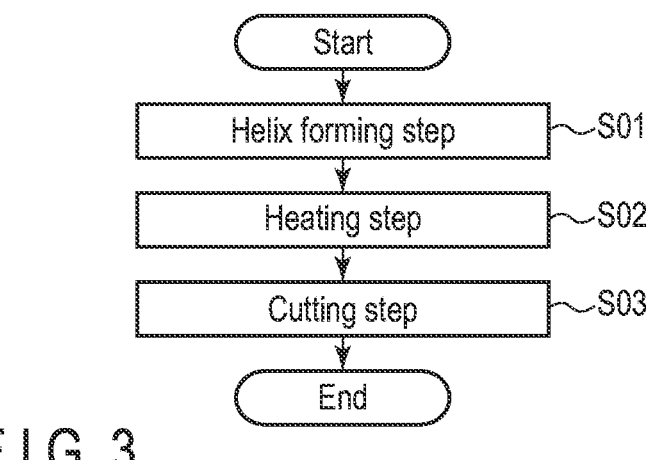
FIG. 3 is a flowchart concerning an operation of the coiling machine according to the first embodiment.

FIG. 3 is a flowchart concerning an operation of the coiling machine 100. The operation shown by the flowchart is realized by the controller 41 by executing the computer programs. The manufacturing process of the coil spring 2 to be carried out by the coiling machine 100 includes a helix forming step 301, heating step S02, and cutting step S03.

In the helix forming step S01, the wire 1 is formed into a helical shape. In the heating step S02 after the helix forming step S01 is completed, a part of the wire 1 is irradiated with laser light, whereby the heated portion 1V is formed in the wire 1. The heated portion 1V includes a portion made softer than the other portions (base material) of the wire 1. In the cutting step S03 after the heating step 302 is completed, the heated portion 1V of the wire 1 is cut.

Figure 4:
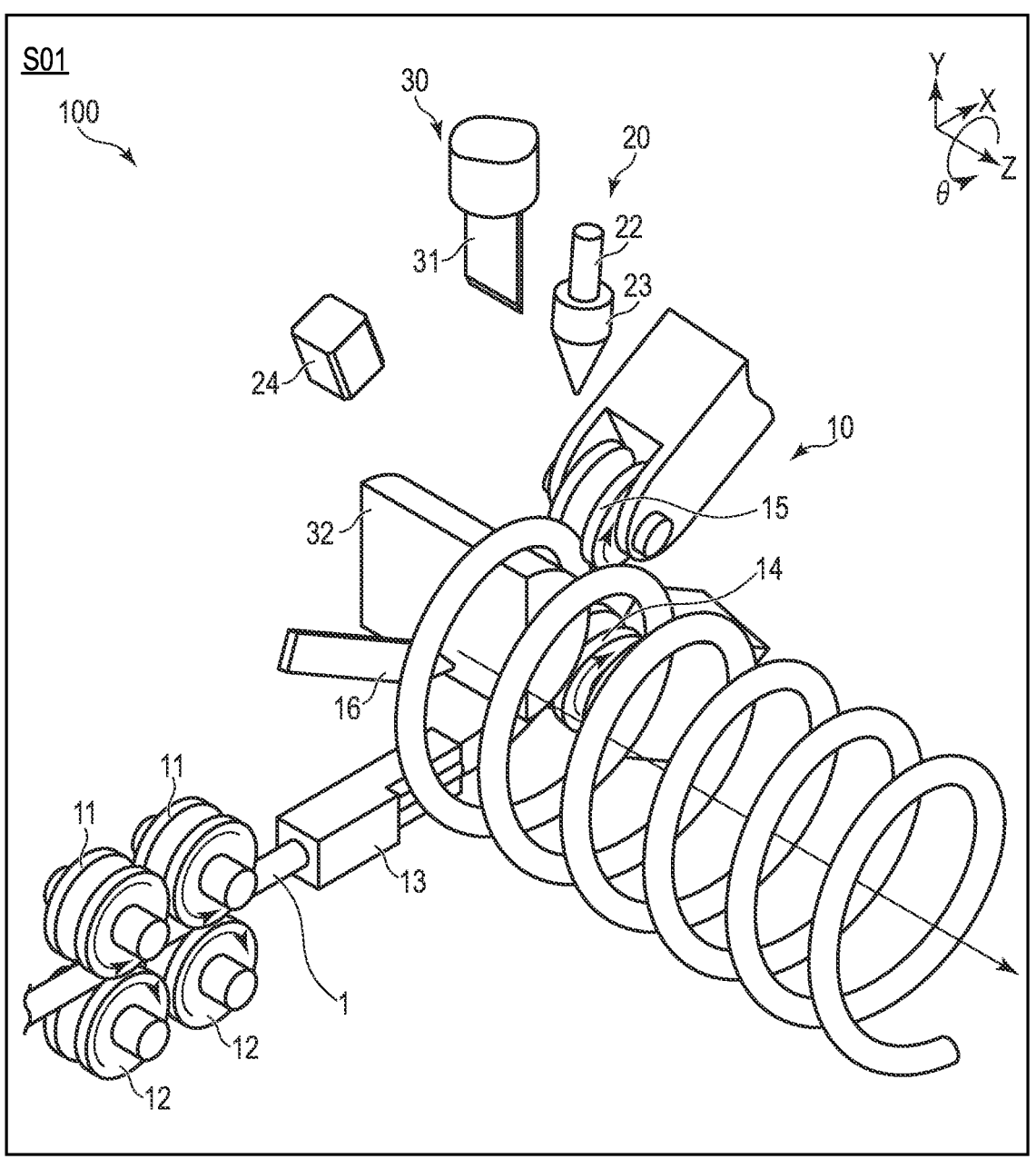
FIG. 4 is a schematic perspective view showing a process of forming a wire into a helical shape by the coiling machine according to the first embodiment.

FIG. 4 is a schematic perspective view of the coiling machine 100 showing a specific example of the helix forming step S01. In the helix forming step S01, the helix forming unit 10 makes the wire 1 move straight in the X-direction by means of the driving rollers 11 and driven rollers 12 to thereby lead the wire 1 to the wire guide 13. The wire 1 output from the wire guide 13 is formed into an arc-like shape by r the first forming roller 14 and second forming roller 15. The wire 1 formed into the arc-like shape is guided by the pitch tool 16 in such a manner as to be formed into a helical shape having a predetermined pitch. Owing to such an operation, the helical wire 1 is gradually elongated in the Z-direction.

Figure 5:
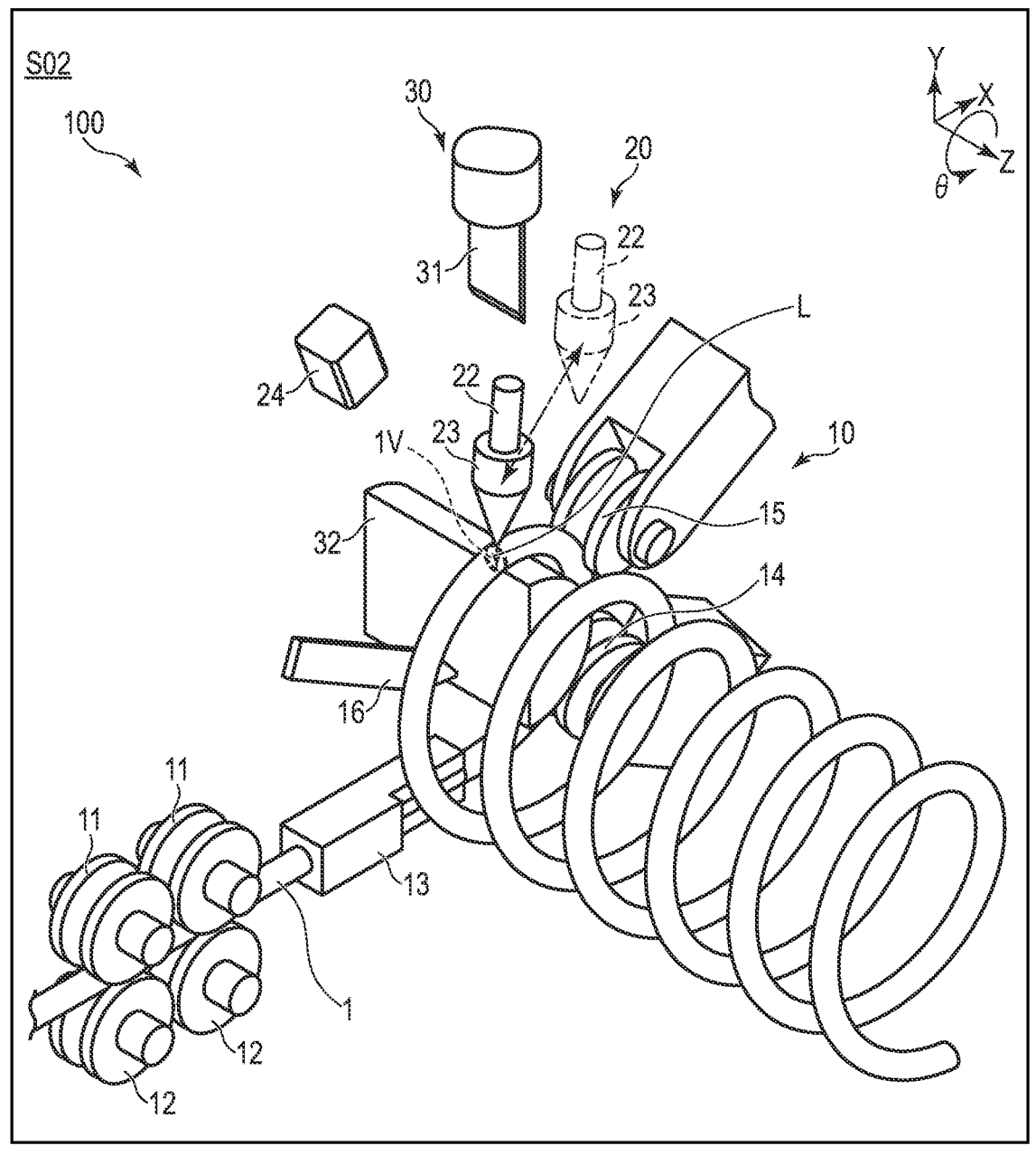
FIG. 5 is a schematic perspective view showing a process of softening a part of a wire by heating the part by means of a heating unit (laser heating machine).

With reference to FIGS. 5 to 9, the heating step S02 will be described below. FIG. 5 is a schematic perspective view of the coiling machine 100 showing a specific example of the heating step S02. In the heating step S02, the laser heating machine 20 directly irradiates, for example, the portion of the wire 1 formed into the helical shape positioned above (below the cutter 31) the end part of the mandrel 32 with laser light. By the energy of the laser light, the base material of the wire 1 is heated and a softened heated portion 1V is formed.

While the heating step S02 is executed, feeding of the wire 1 carried out by the helix forming unit 10 is stopped. The laser heating machine 20 is fixedly arranged at, for example, a predetermined position, and radiates laser light from this position toward a part of the stopped wire 1. As another example, when the laser heating machine 20 includes the above-described migration stage, the laser heating machine 20 may radiate laser light after making the beam spot regulator 23 close to the wire 1 as shown in FIG. 5. Further, the action of the laser heating machine 20 may also be controlled in such a manner that while the heating step S02 is executed, feeding of the wire 1 carried out by the helix forming unit 10 is not stopped, and the laser light irradiation position moves to follow the movement of the cutting position resulting from the coiling operation.

Figure 6:
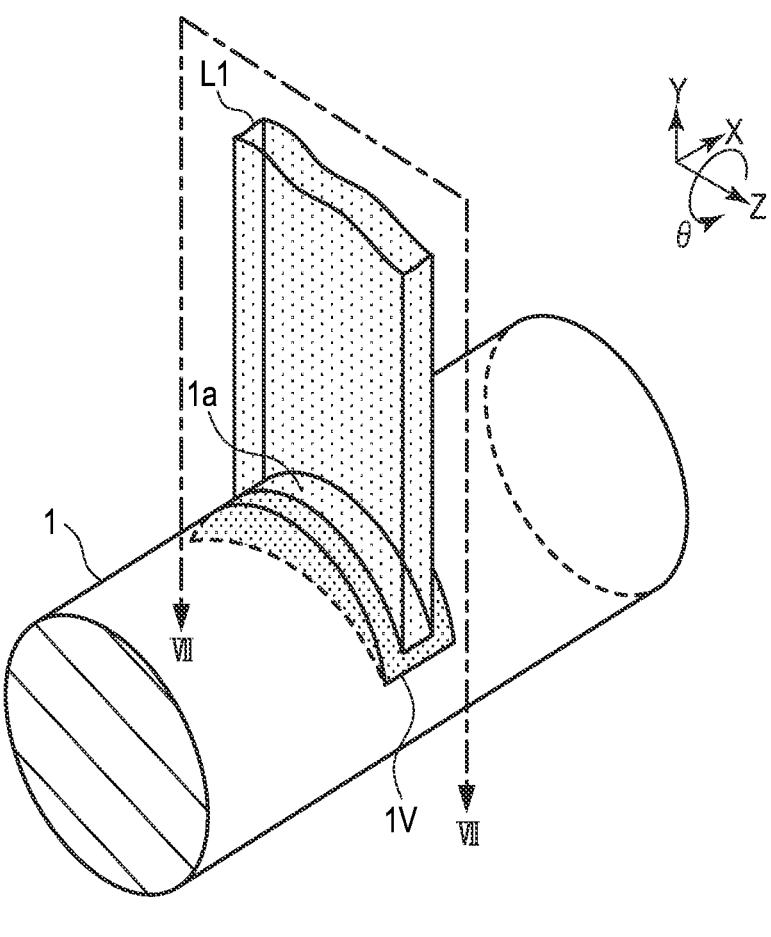
FIG. 6 is a perspective view showing a first example of the method of softening a part of a wire by heating.

FIG. 6 is a perspective view showing a first example of the method of softening a part of the wire 1 by heating. The laser heating machine 20 irradiates the surface of the wire 1 with laser light L1. The laser light L1 has a beam profile elongated in the width direction of the wire 1. In the irradiated area 1a of the wire 1 irradiated with the laser light L1 and surrounding part thereof, a heated portion 1V is formed.

Figure 7:
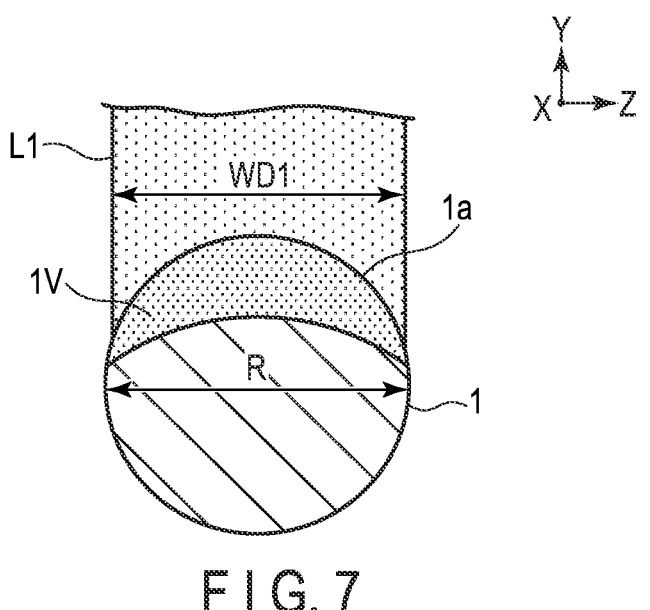
FIG. 7 is a cross-sectional view of the wire along VII-VII line of FIG. 6.

FIG. 7 is a cross-sectional view of the wire 1 along line VII-VII in FIG. 6. The heated portion 1V extends not only to the surrounding part of the irradiated area 1a on the surface of the wire 1, but also to the inside of the wire 1. In the example of FIG. 7, the width WD1 of the laser light L1 in the width direction of the wire 1 is less than the diameter R of the wire 1. Accordingly, the most part of the laser light L1 is applied to the wire 1.

Figure 8:
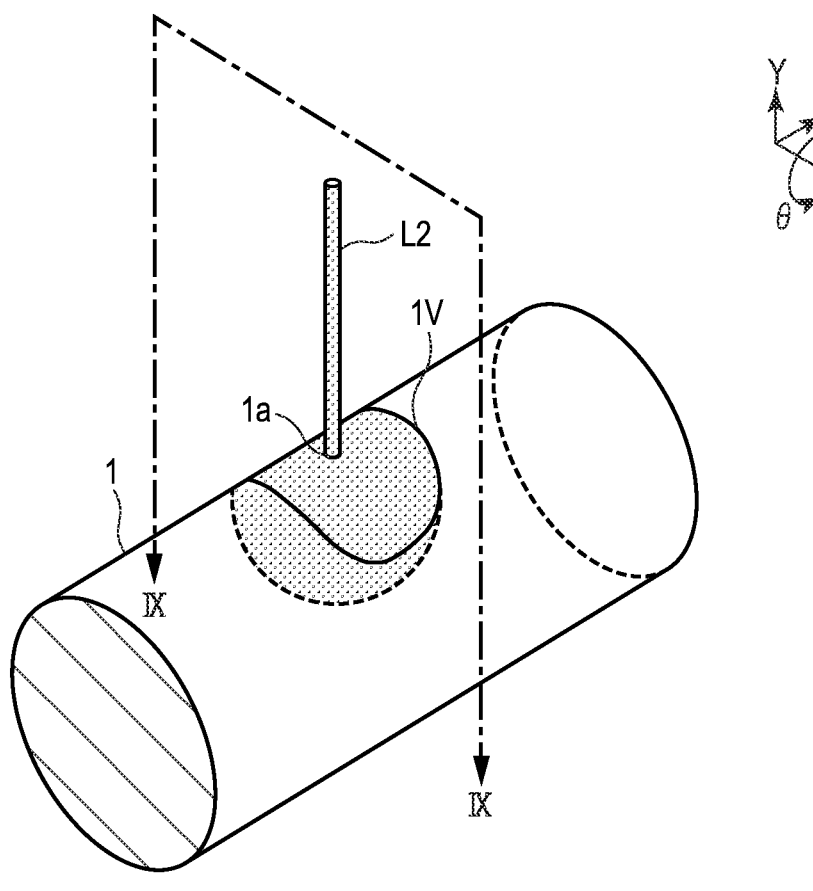
FIG. 8 is a perspective view showing a second example of the method of softening a part of a wire by heating.

FIG. 8 is a perspective view of the wire 1 showing a second example of the method of softening a part of the wire 1 by heating. The laser heating machine 20 irradiates the surface of the wire 1 with laser light L2. The laser light L2 has a beam profile of, for example, a circular shape. In the irradiated area 1a of the wire 1 irradiated with the laser light L2 and surrounding part thereof, a heated portion 1V is formed as in the case of the first example.

Figure 9:
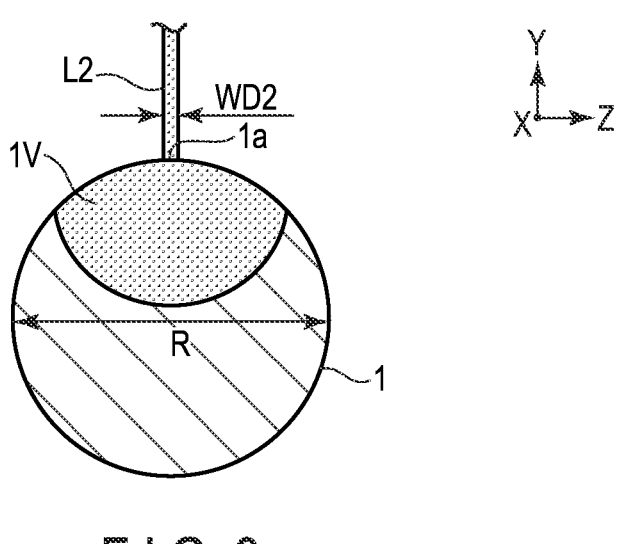
FIG. 9 is a cross-sectional view of the wire along line IX-IX of FIG. 8.

FIG. 9 is a cross-sectional view of the wire 1 along line IX-IX in FIG. 8. The heated portion 1V extends not only to the surrounding part of the irradiated area 1a on the surface of the wire 1, but also to the inside of the wire 1. For example, the width WD2 of the laser light L2 is sufficiently less than the diameter R of the wire 1. Accordingly, the most part of the laser light. L2 is applied to the wire 1.

It should be noted that although in each of the examples of FIGS. 6 to 9, the laser light L1 or L2 parallel to the Y-direction is applied to the top surface of the wire 1 in the Y-direction, the irradiation direction of the laser light L1 or L2 is not limited to this. For example, the laser light L1 or L2 may also be applied to the wire 1 from the direction intersecting the Y-direction. Further, the laser light L1 or L2 may also be applied to the undersurface of the wire 1 in the Y-direction.

The heated portion 1V may extend to a position deeper inside the wire 1 than the examples shown in FIG. 7 and FIG. 9. The shape of the laser light emitted from the laser heating machine 20 is not limited to the first example and second example. The laser light may be applied to only one portion of the wire 1 or may be applied to a plurality of portions thereof.

In both the first example and second example, the heated portion 1V may include a melt pool formed by melting the base material of the wire 1 by the energy of the laser light. In this case, the melt pool may spread not only to parts inside the irradiated area 1a but also to the surrounding part thereof.

The cutting step S03 will be described below with reference to FIG. 10. FIG. 10 is a schematic perspective view of the coiling machine 100 showing a specific example of the cutting step S03. The cutting step S03 is executed after the laser light irradiation is stopped. In the cutting step 303, the heated portion 1V of the wire 1 the temperature of which has become higher than before being irradiated with the laser light is cut by the cutting unit 30. Thereby, the coil spring 2 is manufactured.

More specifically, in the cutting step S03, the cutter 31 is made to descend toward the vicinity of the part of the wire 1 supported on the mandrel 32. At this time, the wire 1 is cut by the impact applied thereto by the cutter 31.

When the heated portion 1V includes a melt pool, the melt pool may solidify within the time when the laser light irradiation is stopped to the time when the cutter 31 operates. Further, the melt pool may solidify after the cutter starts to operate, and when the cutter 31 comes into contact with the surface of the wire 1 to thereby draw heat from the heated portion 1V. As described above, the melt pool solidifies before or during the operation of the cutter 31, whereby it is possible to prevent the molten metal from adhering to the cutter 31.

It is also possible, in the cutting step S03, to operate the cutter 31 on the basis of a result of measurement of the temperature of the heated portion 1V carried out by the measuring instrument 24. That is, the cutter 3 may operate after the laser light irradiation is stopped and, when the temperature of the heated portion 1V lowers to a predetermined target temperature. The above-described target temperature may be, for example, the temperature at which the molten base material solidifies. Of course, in the cutting step S03, the heated portion 1V may be cut without using the measuring instrument 24 by determining in advance a delay time from the stop of laser light irradiation to the start of the operation of the cutter 31.

The cut-off coil spring 2 has a first end 51 including a first end face 51a, and second end 52 including a second end face 52a. After one coil spring 2 is manufactured, the above-described helix forming step 301, heating step S02, and cutting step 303 are executed again, and then the next coil spring 2 is manufactured. Accordingly, both the first end 51 and second end 52 are formed by cutting after the above-described steps are carried out.

The shearing force required to cut the wire decreases with the raise in temperature of the wire resulting from heating. Further, even when the temperature of the wire does not reach the melting point, it is possible to reduce the shearing force. Furthermore, such a tendency described above is independent of the diameter of the wire. As one example, it is desirable that when the wire 1 is about to be cut by the cutter 31, the temperature of at least a part of the heated portion 1V be higher than or equal to 500° C.

Subsequently, the advantageous effects of the coiling machine 100 and manufacturing method of a coil spring 2 according to this embodiment will be described below. In this embodiment, a part of the wire 1 formed into a helical shape is heated by laser light, and the portion (heated portion 1V) the temperature of which is higher, than before being irradiated with the laser light after the irradiation of the laser light is stopped is cut by the cutting components (cutter 31 and mandrel 32). When the wire 1 is heated, the shearing force required for cutting becomes less. Therefore, according to this embodiment, it is possible to easily cut the wire 1.

When the laser heating machine 20 is used as in the case of this embodiment, it is possible to selectively and rapidly heat the portion to be cut by means of laser light. When the laser heating machine 20 is used, it is possible to arbitrarily set the heat input amount of heat to be input to the portion to be irradiated with laser light by adjusting the drive current of the laser oscillator 21. Further, it is possible to increase/decrease the output of the laser light by making a quick response to the adjustment of the drive current. Furthermore, it is possible to make the heated portion 1V carry out rapid self-cooling by stopping the laser light irradiation carried out by the laser heating machine 20. It should be noted that the term 'rapid self-cooling' implies that the heated portion 1V is rapidly cooled without aggressively cooling the heated portion 1V by using members and devices for cooling.

Further, it is possible for the laser heating machine 20 to arbitrarily set the irradiated area 1a to be irradiated with the laser light and heated portion 1V of the wire 1 by adjusting the irradiation angle of the laser light relative to the wire 1 or by using a lens or mirror. Accordingly, it is possible for the laser heating machine 20 to heat an arbitrary area of the wire 1 to an arbitrary temperature with a high degree of responsiveness in accordance with the thickness of the wire 1, material for the wire 1, required takt time (cycle time), and the like.

Further, according to the configuration of this embodiment, the heated portion 1V in the state where the portion 1V is softened by the high temperature is cut, whereby the reaction force received by the cutter 31 and mandrel 32 from the wire 1 at the time of cutting is reduced. Accordingly, it is possible to suppress wear and tear of the cutter 31 and mandrel 32, and damage to these members. As a result, it is possible to make the replacement cycle of the cutter 31 or mandrel 32 longer than ever before and thereby reduce the running cost, and to lower the specification of abrasion resistance property or the like required of the materials for the cutter 31 and mandrel 32 and thereby form these members at lower costs than ever before. Further, it is possible to suppress lowering of the operating rate of the coiling machine 100 concomitant with the replacement of the cutter 31 and mandrel 32.

Further, according to the configuration of this embodiment, even when a wire 1 having a relatively large diameter is used, it is possible to cut the wire 1 without excessively increasing the time required for cutting of the wire 1. Furthermore, regarding the coiling machine 100, even when a wire 1 having a relatively large diameter is used, it is not necessary to impart a relatively higher capability to the cutter 31 and mandrel 32. Accordingly, even when a wire 1 having a relatively large diameter is used, it is possible to maintain the mass-productivity, and suppress the cost required for the cutter 31 and mandrel 32.

Further, in this embodiment, the wire 1 is not cut by using only the laser light irradiation, the wire 1 is cut by further using the cutter 31. According to such a configuration, it is possible to suppress the required intensity of the laser light. That is, the laser heating machine 20 radiates laser light not for the purpose of cutting the wire 1 but for the purpose of softening the wire 1, whereby it is possible to make the intensity of the laser light lower as compared with the case where the wire 1 is cut by only the laser light. As a result, it is possible to suppress occurrence of the spatter and dross which can occur when the wire 1 is irradiated with laser light of high intensity, and make the facilities and cost for assist gas blowing unnecessary. Accordingly, it is possible to increase the operating rate of the coiling machine 100 by keeping the cleanliness of the coil spring 2 to be manufactured and thereby making washing thereof unnecessary, and by reducing the maintenance work concerning removal of the spatter adhering to the coiling machine 100 itself. Furthermore, it is possible to simplify or decommission the facilities such as a suction device or the like necessary for removal of the spatter.

Further, according to the configuration of this embodiment, it is possible to limit the irradiation range of the laser light relative to the wire 1. That is, the laser heating machine 20 radiates laser light rot for the purpose of cutting the wire 1 but for the purpose of softening the wire 1, and hence the laser heating machine 20 need not necessarily irradiate the entire area of the position scheduled to be cut and, it is sufficient if the laser heating machine 20 can irradiate a part of the wire 1 in the width direction with laser light as shown in, for example, FIGS. 6 to 9. More specifically, it is possible fox the laser heating machine 20 to irradiate the central part of the wire 1 with laser light while avoiding both the end parts of the wire 1 in the width direction thereof. In this case, even when the position to be irradiated with laser light is shifted from the correct position relatively to the wire 1, it is possible to prevent the laser light from extending out of both the end parts of the wire 1 to thereby cause a shortage of the amount of laser light irradiation to be applied to the wire 1 or to thereby thermally and adversely affect the coiling machine 100 itself.

Further, it is possible to prevent the laser light to be applied to the wire 1 from leaking from the opposite side of the wire 1. That is, the laser heating machine 20 radiates laser light not for the purpose of cutting the wire 1 but for the purpose of softening the wire 1, and hence the laser heating machine 20 need not radiate laser light in such a manner as to penetrate and split up the wire 1. Accordingly, it is possible to largely simplify or decommission the configuration for shielding the laser light as compared with the conventional coiling machine configured to cut the wire by means of laser light.

Further, according to the configuration of this embodiment, in particular, when the wire 1 after being formed into a helical shape by cold working is heated and cut, it is possible to maintain the shape accuracy of the coil spring 2 higher as compared with the case of warm working.

Assuring that the wire 1 is cut by only laser light, it is necessary to relatively enhance the intensity of the laser light, and hence it is difficult to form the first end face 51*a* and second end face 52*a* flat. Further, when the wire 1 is cut by only the cutter without using laser light, it is necessary to apply strong shearing force to the wire 1, and hence large unevenness is liable to occur on each of the end faces 51*a* and 52*a*. Conversely, in this embodiment, the wire 1 is cut not only by means of laser light irradiation, but also by means of the cutter 31, and thus it is possible to make the intensity of the laser light lower, and make the shearing force of the cutter 31 less, whereby it becomes possible to form the end faces 51*a* and 52*a* flat. As a result, it is possible to obtain a coil spring 2 excellent in quality.

As described above, when the heated portion 1V is at least partially heated to a temperature higher than or equal to 500° C. at the time of cutting by the cutter 31, it is possible to cut the wire 1 in the high-temperature solid state where the heated portion 1V is sufficiently softened (working resistance of the wire 1 is sufficiently reduced). Regarding carbon steel to be generally used as a material for the wire 1, by heating the steel to a temperature higher than or equal to about 500° C., the tensile strength (TS) thereof becomes about half the TS at normal temperature or less, and it is possible to easily cut the steel by the cutter 31.

As described above, when a melt pool is formed at the heated portion 1V, it is possible to make the heated portion 1V extend to a position deep inside the wire 1. Thereby, the wire 1 is softened up to the part thereof deep inside, and cutting of the wire 1 by the cutter 31 is further facilitated.

In addition to the above, various appropriate effects can be obtained from this embodiment.

Second Embodiment

A second embodiment will be described below. In this embodiment, appropriate conditions fox cutting the wire 1 by using the above-described coiling machine 100 will mainly be disclosed. The configuration of the coiling machine and flow of the manufacturing method of the coil spring using the coiling machine 100 are identical to the first embodiment.

Figure 11:
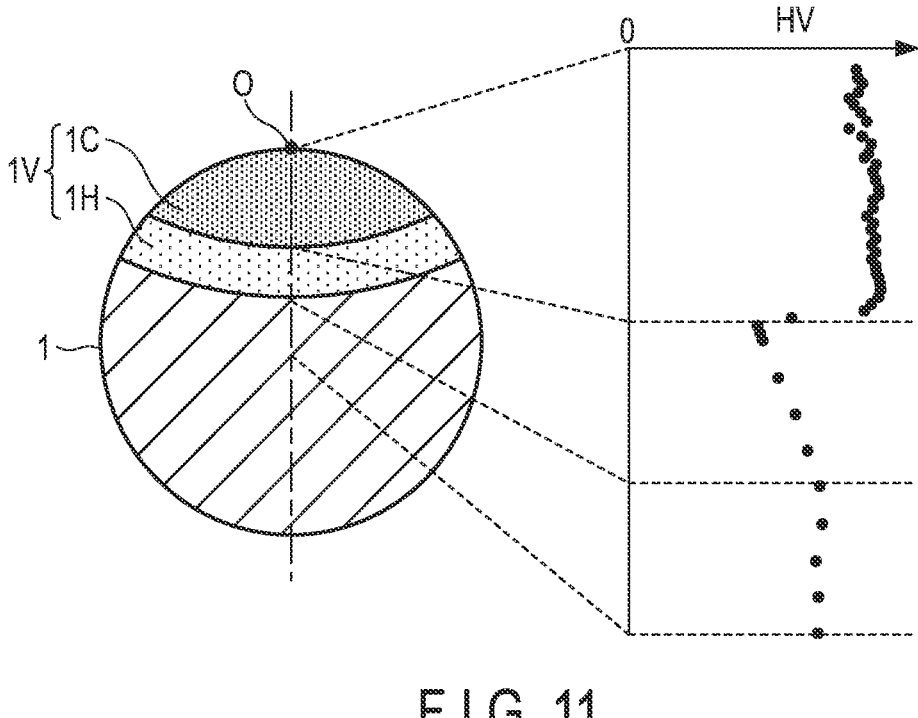
FIG. 11 is a schematic cross-sectional view of a wire irradiated with laser light in a coiling machine according to a second embodiment.

FIG. 11 is a schematic cross-sectional, view of the wire 1 irradiated with laser light. Here, the case where the surface of the wire 1 is irradiated with laser light (L2) having a shape shown in FIG. 8, and melt pool is formed is assumed. Here, O in FIG. 11 indicates the center of the irradiated area irradiated with the laser light on the outer circumferential surface of the wire 1. As an example, this irradiation center O corresponds to a position irradiated with the peak part of the beam profile of the laser light having the highest intensity. Further, it is also possible to consider the irradiation center O as the center of the melt pool.

As described above, when the wire 1 is irradiated with the laser light, the heated portion 1V is formed. During irradiation of the laser light or immediately after irradiation of the laser light, a melt pool is formed around the irradiation center O. The melt pool is solidified by subsequent cooling and a quench-hardened zone 1C is formed. Around the melt pool, a heat-affected zone (HAZ) 1H which is not melted but is changed to be different in characteristics from the base material of the wire 1 by the heat at the time of laser light irradiation is formed. As described above, the heated portion 1V includes the quench-hardened zone 1C and heat affected zone 1H.

In FIG. 11, a result of measuring the Vickers hardness as to each of the quench-hardened zone 1C, heat affected zone 1H, and base material of the wire 1 is shown. The quench-hardened zone 1C as a whole has higher hardness as compared with the base material. On the other hand, the heat affected zone 1 as a whole has lower hardness as compared with the base metal. The hardness of the heat affected zone 1H gradually becomes higher from the vicinity of the quench-hardened zone 1C toward the base material.

As described above, in the heated portion 1V, the distribution of hardness is not uniform. Accordingly, it is necessary to appropriately determine the positional relationships between the positions of the cutter 31 and mandrel 32, and irradiated area irradiated with laser light.

Figure 12:
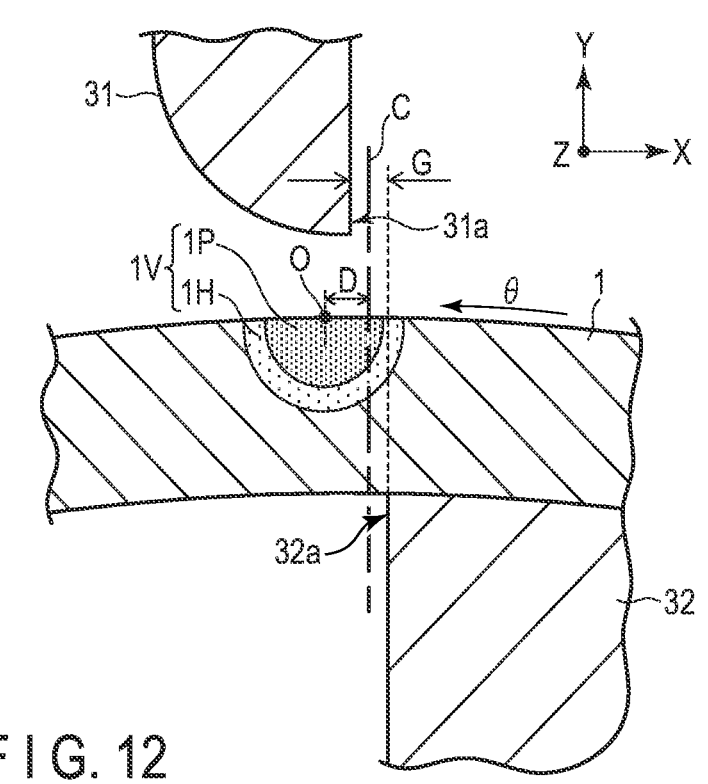
FIG. 12 is a cross-sectional view showing an example of appropriate positional relationships between a cutter, mandrel, and irradiated area irradiated with laser light.

FIG. 12 is cross-sectional view showing an example of appropriate positional relationships between the cutter 31, mandrel 32, and irradiated area irradiated with laser light. In the above-described helix forming step S01, the wire 1 formed into the helical shape is fed to a position between the cutter 31 and mandrel 32. In the feed direction (θ-direction) of the wire 1, between the end part 31*a* of the cutter and end part 32*a* of the mandrel 32, a clearance G is provided. Hereinafter, the center of the clearance G in the θ-direction is referred to as the clearance center C.

In the example of FIG. 12, the clearance center C and irradiation center O are shifted from each other in the θ-direction. More specifically, the irradiation center O is positioned on the cutter 31 side (downstream side in the r-direction) of the clearance center C.

In the example of FIG. 12, the heated portion 1V includes the melt pool 1P which becomes the quench-hardened zone 1C after solidification. For example, the melt pool 1P and clearance center C are overlapped with each other. Further, the melt pool 1P is overlapped with the end part 31*a* of the cutter 31 when viewed from the Y-direction.

On the other hand, the melt pool 1F is not overlapped with the end part 32*a* of the mandrel. 32 when viewed from the Y-direction. In the example of FIG. 12, the end part 32*a* of the mandrel 32 and a part of the heat affected zone 1H positioned on the upstream side of the melt pool 1P overlap each other when viewed from the Y-direction.

FIG. 13 is a cross-sectional view showing a state where the wire 1 is cut by lowering the cutter 31 in the Y-direction from the state shown 1 FIG. 12. As described above, when wire 1 is cut by the cutter 31, the melt pool 1P is already solidified or the melt pool 1P is solidified by being deprived of heat thereof by the contact with the cutter 31. Accordingly, while the wire 1 is cut, the quench-hardened zone 1C is already formed. It should be noted that when the wire 1 to be cut, part of the melt pool 1P may remain inside the heated portion 1V.

When the tip part of the cutter 31 applies an impact to the outer circumferential surface of a part of the wire 1 protruding from the end part 32a of the mandrel 32, shearing force is applied to the heated portion 1V and surrounding par thereof, whereby the wire 1 is broken at around the portion 1V. The cutter lowers to, for example, a position close to the axis of the wire 1 at the maximum. On the cut wire 1, i.e., on the coil spring 2, a dent B attributable to the cutter 31 is formed. Although in the example of FIG. 13, the quench-hardened zone 1C and heat affected zone are overlapped with the dent B, they may be shifted from each other.

As described above, the heat affected zone 1H is lower in hardness than the quench-hardened zone 1C and base material of the wire 1. Accordingly, when the cutter 31 applies an impact to the wire 1, in the heated portion 1V, the heat affected zone 1H is susceptible to fracture. In particular, when the irradiation center O is shifted from the clearance center. C to the cutter 31 side as shown in FIG. 12, it is possible to effectively apply the burden to a part of the heat affected zone 1H positioned on the upstream side of the melt pool 1P in the θ-direction and thereby fracture the wire 1 at this part.

FIG. 14 is a schematic side view of the coil spring 2 cut off from the wire 1 by the method shown in FIG. 12 and FIG. 13. The coil spring 2 has the first end 51 including the first end face 51a, and second end 52 including the second end face 52a.

The first end face 51a corresponds to a fracture surface of the coil spring 2 cut off from the wire 1 in FIG. 13. The first end 51 includes a first irradiation scar M1 of the laser light and dent B of the cutter 31. The first irradiation scar M1 includes the quench-hardened zone 1C and heat affected zone 1H (first heat affected zone).

The second end face 52a corresponds to the fracture surface of the wire 1 left on the mandrel 32 when the coil spring 2 manufactured before the current coil spring 2 is cut off from the wire 1. The second end 52 includes a second irradiation scar M2 of the laser light. The second irradiation scar M2 includes the heat affected zone 1H (second heat affected zone). When the wire 1 is cut as shown in FIG. 13, the second irradiation scar M2 includes no quench-hardened zone 1C. However, the second irradiation scar M2 may include, for example, a quench-hardened zone 1C less than the first irradiation scar M1.

The heat affected zone 1H included in the first irradiation scar M1 extends to at least a part of the first end face 51a. Further, the heat affected zone 1H included in the second irradiation scar M2 extends to at least a part of the second end face 52a. On the other hand, the quench-hardened zone 1C included in the first irradiation scar M1 does not extend to the first end face 51a. However, a part of the quench-hardened zone 1C may extend to the first end face 51a. In this case, it is desirable that the area of the quench-hardened zone 1C be less than the area of the heat affected zone 1H in the first end face 51a.

Subsequently, regarding the positional relationships between the first irradiation scar M1, second irradiation scar M2, and dent B, some aspects will be exemplified.

FIG. 15 shows a first example of the first irradiation scar M1, second irradiation scar M2, and dent 3, and shows a schematic cross-sectional view of the coil spring 2 at each of the first end 51 and second end 52. The cross section shown on the left side in FIG. 15 corresponds to the cross section of the first end 51 along line CA-CA in FIG. 14. The cross section shown on the right side in FIG. 15 corresponds to the cross section of the second end 52 along line CB-CB in FIG. 14. In each of the first end 51 and second end 52, the upper surface in FIG. 15 is the outer circumferential surface 2a of the coil spring 2, and lower surface in FIG. 15 is the inner circumferential surface 2b of the coil spring 2.

The broken line arrow in FIG. 15 indicates the irradiation direction D1 of the laser light at the time of heating. The solid line arrow indicates the moving direction D2 of the cutter 31 at the time of cutting. In the example of FIG. 15, each of the irradiation direction D1 and moving direction D2 is the direction from the upper part in FIG. 15 to each end 51, 52. However, when the ends 51 and 52 are viewed from a direction different from the direction of the cross sections shown in FIG. 15, these directions D1 and D2 may intersect each other.

In the first end 51 shown on the left side in FIG. 15, the first irradiation scar M1 includes the quench-hardened zone 1C and heat affected zone 1H. Further, the whole surface of the first irradiation scar M1 is over lapped with the dent B. In the second end 52 shown on the right side in FIG. 15, the second irradiation scar M2 includes the heat affected zone 1H, and includes no quench-hardened zone 1C. Further, on the second end 52, no dent B is formed. Each of the first irradiation scar M1, second irradiation scar M2, and dent B is formed on the outer circumferential surface.

FIG. 16 shows a second example of the first irradiation scar M1, second irradiation scar M2, and dent B, and shows a schematic cross-sectional view of the coil spring 2 at each of the first end 51 and second end 52 as in the case of FIG. 15. In the example of FIG. 16, the irradiation direction D1 forms an acute angle (for example 40°) with the moving direction D2. Accordingly, in the first end 51, the first irradiation scar M1 includes a part thereof overlapping the dent B and part thereof not over lapping the dent B. In the case of such a configuration, the cutter 31 comes into contact with a hard part (base material) other than the heated portion 1V at the time of cutting, and hence it is possible to make the dent B less as compared with the first example.

FIG. 17 shows a third example of the first irradiation scar M1, second irradiation scar M2, and dent B, and shows a schematic cross-sectional view of the coil spring 2 at each of the first end 51 and second end 52 as in the case of FIG. 15. In the example of FIG. 17, the irradiation direction D1 and moving, direction D2 are directions opposite to each other. The first irradiation scar M1 and the second irradiation scar M2 are formed on the inner circumferential surface 2b. The dent B is formed on the outer circumferential surface 2a. At the first end 51, the whole of the first irradiation scar M1 is not overlapped with the dent B. In the case of such a configuration, the cutter 31 does not come into contact with the heated portion 1V at the time of cutting, and hence the dent can be made further less as compared with the second example.

In addition to the above, the first irradiation scar M1, second irradiation scar M2, and dent B can be formed in various aspects. For example, the dent B may be formed not only at the first end 51 but also at the second end 52. In this case, the dent B of the second end 52 may be less than the dent B. of the first end 1.

It should be noted that although up to this point, the case where the wire 1 is irradiated with the laser light (L2) having the shape shown in FIG. B is assumed, the same configuration as above can be applied to the case where the wire 1 is irradiated wish the laser light (L1) having the shape shown in FIG. 6.

FIG. 18 is a schematic plan view of the wire 1 after being irradiated with the laser light having the shape shown in FIG. 6. The irradiation center O of the laser light extends in the direction orthogonal to the axial direction of the wire 1. Accordingly, in the heated portion iv formed by the irradiation of this laser light, the melt pool 1P (or quench-hardened zone 1C after solidification) has a shape elongated in the width direction of the wire 1. Likewise, the heat affected zone 1H around the quench-hardened zone 1C has a shape elongated in the width direction of the wire 1. Although in the example of FIG. 18, the heat affected zone 1F extends from one end to the other end of the wire 1 in the width direction thereof, the example is not limited to this.

When the wire 1 on which such a heated portion 1V is formed is cut, a distance TD is provided between the irradiation center C and clearance center C by shifting the irradiation center (from the clearance center C to the cutter 31 side (left side in FIG. 18). In the example of FIG. 18, the clearance center C is overlapped with the melt pool 1P. Further, the end part 32a of the mandrel 32 is overlapped with a part of the heat affected zone 1H positioned on the upstream side of the melt pool 1P in the θ-direction.

When the wire 1 is cut by means of the cutter 31 in this state, as in the case of FIG. 12 and FIG. 3, it is possible to apply the shearing force to a part of the heat affected zone 1H positioned on the upstream side of the melt pool 1P in the θ-direction and fracture this part.

As described above, in this embodiment, by shifting the irradiation center O and clearance center C from each other, it is possible to fracture the wire 1 at the heat affected zone 1H the hardness of which is less as compared with the other parts. In this case, it is possible to make the shearing force needed to cut the wire 1 less as compared with, for example, the case where the wire 1 is fractured at the quench-hardened zone 1C.

It should be noted that the inventors of the present invention have carried out, a plurality of times, the experiment of cutting the wire 1 for each of the case where the irradiation center C and clearance center C are made overlapped with each other, case where the irradiation center (is shifted from the clearance center to the cutter 31 side, and case where the irradiation center C) is shifted from the clearance center C to the mandrel 32 side. As a result, the fracture surface of the case where the irradiation center O is shifted from the clearance center C to the cutter 31 side is the flattest, and fracture surface of the case where the irradiation center O and clearance center C are made overlapped with each other is the second flattest. From this result, it can be seen that by shifting the irradiation center O from the clearance center C to the cutter 31 side as in the case of this embodiment, the coil spring 2 having the flatter first end face 51a and flatter second end face 52a can be obtained.

When the wire 1 is formed into a helical shape and the helically formed wire 1 is cut by means of the cutter 31, a certain amount of residual stress occurs at each of the first end face 51a and second end face 52a of the coil spring 2. Such residual stress becomes a cause of breakage of the end faces 51a and 52a. Further, when the coil spring 2 is made to undergo a process of energizing the coil spring 2 to thereby cause a temperature rise thereof, the residual stress can be removed. However, in this method, the temperatures of both the ends of the coil springy 2 hardly rise, and hence various contrivances should be made.

Regarding this point, in the coil spring 2 manufactured by cutting the wire 1 under the condition of this embodiment, the heat affected zone 1H widely spreads in each of the first end face 51a and second end face 52a. In this case, the hardness of the heat affected zone 1H is lower as compared with the other parts, and hence the residual stress is reduced in this zone. Further, the above-described process of removing the residual stress can be omitted.

In the example shown in FIG. 18, the heat affected zone 1H spreads from one end of the wire 1 in the width direction thereof to the other end thereof. In this case, the heat affected zone 1H spreads over a wider range of the fracture surface. Accordingly, it is possible to more obviously obtain the effect of suppressing breakage of the end faces 51a and 52a.

It should be noted that it is needless to say that in implementing the present invention, the aspects of the configurations and arrangements of the elements provided in the coiling machine 100 can variously be changed as the need arises to thereby implement the present invention.

In each of the embodiments, the configuration in which the coiling machine 100 cuts the heated portion 1V by means of the cutter 31 is exemplified. The coiling machine 100 is not limited to the configuration described above, and may cut the heated portion 1V of the wire 1 by a cutting operation using a rotary saw.

The aspects of the coil springs 2 to be manufactured by the coiling machine 100 widely vary and, for example, the coil diameter and pitch may change in the axial direction of the coil spring. That is, the coil springs 2 to be manufactured by the coiling machine 100 may include coil springs of various aspects such as a cylindrical coil spring, barrel-type coil spring, hourglass-type coil spring, tapered coil spring, irregular-pitch coil spring, and coil spring including a negative-pitch part, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coiling machine comprising:

a helix forming unit which feeds a wire and forms the wire into a helical shape while feeding;

a laser heating machine which irradiates the wire formed into the helical shape with laser light;

cutting components which cut the wire; and a controller which controls the helix forming unit, the laser heating machine, and the cutting components, wherein:

the cutting components include:

a mandrel which supports thereon an inner circumferential surface of the wire formed into a helical shape; and a cutter which applies an impact to an outer circumferential surface of a part of the wire protruding from an end part of the mandrel to thereby cut the wire, and the controller is configured to execute processes comprising:

controlling the helix forming unit to feed the wire and form the wire into the helical shape, and thereafter to stop feeding the wire;

while the feeding of the wire is stopped, controlling the laser heating machine to irradiate a portion of the wire positioned under the cutter with the laser light to thereby heat the portion; and after the irradiation of the laser light and while the feeding of the wire is stopped, controlling the cutting components to cut the portion of the wire whose temperature has been raised as compared to a temperature thereof before irradiation with the laser light.

2. The coiling machine of claim 1, wherein the processes comprise controlling the cutting components to cut the portion of the wire when the temperature of the portion of the wire is higher than or equal to 500° C.

3. The coiling machine of claim 1, wherein the processes comprise:

controlling the laser heating machine to irradiate the portion of the wire with the laser light to thereby form a melt pool and a heat affected zone around the melt pool in the wire, and controlling the cutting components to cut the heat affected zone of the wire.

4. The coiling machine of claim 1, wherein:

a clearance is provided between the cutter and the end part of the mandrel in a feed direction of the wire, and when the cutter applies the impact to the wire, a center of the clearance and a center of an irradiated area irradiated with the laser light on the wire are shifted from each other in the feed direction.

5. The coiling machine of claim 4, wherein the center of the irradiated area is positioned on the cutter side of the center of the clearance in the feed direction.

6. The coiling machine of claim 5, wherein:

the processes comprise controlling the laser heating machine to irradiate the portion of the wire with the laser light to thereby form a melt pool and a heat affected zone around the melt pool in the wire, and when the cutter applies the impact to the wire, the end part of the mandrel and a part of the heat affected zone positioned on the upstream side of the melt pool in the feed direction are overlapped with each other when viewed from a moving direction of the cutter.

* * * * *